United States Patent [19]
Jarvis et al.

[11] Patent Number: 4,481,843
[45] Date of Patent: Nov. 13, 1984

[54] AUTOMATIC TRANSMISSION

[75] Inventors: Roger P. Jarvis; Harry M. Windsor, both of Leamington Spa, England

[73] Assignee: Automotive Products Limited, Leamington Spa, England

[21] Appl. No.: 347,463

[22] Filed: Feb. 10, 1982

[30] Foreign Application Priority Data

Feb. 12, 1981 [GB] United Kingdom ............... 8104385

[51] Int. Cl.³ ..................... B60K 41/08; B60K 41/28
[52] U.S. Cl. ................................ 74/866; 192/0.052; 192/3.58
[58] Field of Search ............. 192/0.076, 0.075, 0.032, 192/0.073, 0.052, 0.092, 3.58; 74/866, 872, 877

[56] References Cited

U.S. PATENT DOCUMENTS

| | | | |
|---|---|---|---|
| 3,604,288 | 9/1971 | Mori | 74/864 |
| 3,710,651 | 1/1973 | Marumo et al. | 74/866 |
| 3,738,460 | 6/1973 | Murakami et al. | 192/3.58 |
| 3,823,621 | 7/1974 | Kubo et al. | 74/864 |
| 4,019,614 | 4/1977 | Prenzel et al. | 192/3.58 |
| 4,294,341 | 10/1981 | Swart | 192/0.073 |
| 4,350,058 | 9/1983 | Miller et al. | 74/866 |
| 4,388,845 | 6/1983 | Kishi et al. | 74/866 X |

FOREIGN PATENT DOCUMENTS 57322 8/1982 European Pat. Off. ......... 192/0.032

Primary Examiner—George H. Krizmanich
Attorney, Agent, or Firm—Kemon & Estabrook

[57] ABSTRACT

A control system for a rotary transmission for controlling pressure during speed ratio changes. The system includes a pump for delivering fluid under pressure which fluid selectively engages speed ratio selectors to enable the drive to be transmitted through the transmission. The system also embodies a regulator for regulating the fluid pressure in response to a throttle controlled torque demand signal. The system also includes sensors arranged to provide a signal to indicate the state of a speed ratio as well as a command signal to effect a change in the speed ratio.

10 Claims, 4 Drawing Figures

AUTOMATIC TRANSMISSION

This invention relates to automatically controlled rotary power transmissions for motor vehicles and particularly to multi-speed transmissions having fluid controlled components.

Such transmissions frequently use fluid under pressure to operate speed ratio selector means such as friction clutches, one clutch being provided for each additional speed ratio. It has been a continuing problem in such transmissions to ensure smooth engagement and disengagement of a drive torque transmitting clutch under all conditions of intended use.

It has been proposed to vary continuously clutch engagement pressure with the driving torque transmitted through the transmission. Although it has not proved practical to measure actual driving torque it is possible to sense vehicle throttle opening which gives an indication of required driving torque.

A mechanical or electrical indication of throttle opening is provided as a control input to most automatic transmissions and may be used to control directly transmission main pressure or clutch engagement pressure.

Such a direct control is simple and economical to manufacture but cannot regulate clutch engagement pressure to the optimum value under certain transmission operating circumstances.

For example, during a full throttle speed ratio downchange (when travelling up a slope of increasing gradient) clutch engagement pressure is often too high and the consequent clutch engagement is too fierce. This is explained as follows:

During a full throttle ratio upchange engine power is trying to increase engine speed. However, during a ratio upchange, engine speed must fall. Consequently clutch torque capacity being substantially proportional to engagement pressure, must be sufficient not only to transmit maximum engine torque but to have an excess capacity sufficient to pull engine speed down to the required level against the effect of engine power. Thus for a given clutch, maximum engagement pressure is set to this duty and clutch torque capacity is typically 1.4×maximum engine torque.

During a full throttle ratio downchange engine power is trying to increase engine speed. Engine speed will rise during a downchange and consequently excess clutch torque is not required. However, since engagement pressure is set according to throttle opening, maximum pressure is applied to engage the clutch, thus resulting in a fierce ratio change.

Other circumstances when clutch engagement pressure is not at an optimum may be readily envisaged by persons skilled in the art of automatic transmission control.

It has been proposed hitherto, for example in British Pat. No. 1365036, to provide electrical means by which fluid pressure for operating gear ratio selectors can be lowered briefly during ratio changes to reduce jerking. However the system is complex in that it involves, for example, a number of monostable multivibrators to control the brief pressure reduction and a complex throttle controlled voltage transducer system for providing inputs to the monostable multivibrators.

An object of the present invention is to provide an effective yet simple system for controlling pressure during speed ratio changes to avoid jerking and, according to the invention there is provided a control system for a rotary power transmission having means for providing a series of speed ratios, a pump for delivering fluid under pressure, speed ratio selectors selectively engageable by means of the fluid pressure to enable drive to be transmitted through the transmission, and regulator means for regulating the fluid pressure in response to a transmission torque demand signal, said control system including sensor means arranged to provide a sensor signal which indicates a state of engagement or disengagement of a speed ratio command means arranged provide a command signal which causes the selector means to select a different speed ratio, said command means being operable in response to transmission operating parameters, logic means arranged to receive said sensor signal and command signal and which in response thereto provides a control signal for modifying the torque demand signal, and delay means responsive to said control signal to delay the effect of initiation and/or cessation of said control signal on said torque command signal.

With such a system, the user of a logic means to receive the sensor and command signals and to produce the control signal is a particularly simple way of generating the control signal. Moreover, the duration of the control signal is easily determined because once the sensor signal ceases, thereby indicating that the ratio change has been effected, the control signal also ceases. However, the effect of such cessation is controlled by the delay device which preferably allows a gradual resumption of pre ratio change pressure.

Preferably, the speed ratio selector means comprises clutches of known kind for selecting the respective speed ratios and the command signals actuate said clutches to select the desired ratios whereby on receiving a command signal, a clutch will effect a change of ratio from one speed ratio to another speed ratio and the sensor signal for indicating that the other speed ratio has been selected will thereupon be produced to provide an input to said logic means and on receiving the command signal to re-select the said one speed ratio, the command signal will be received as a further input to the logic means which will then produce the control signal for modifying the torque demand signal. The said one speed ratio may be lower than the other speed ratio so that the modification of the torque demand signal takes place during a speed ratio downchange. This is particularly advantageous as it is during such a downchange where a fierce ratio change is likely to occur as described earlier.

The logic means may comprise an AND element which provides an output for producing the control signal after receiving the command signal and sensor signal as inputs. The use of an AND element is advantageous in at least two respects. Firstly the construction of an AND element is particularly simple and secondly the AND element automatically controls the length of time that the control signal is applied because as soon as the sensor or command signal ceases following a speed ratio change the AND element loses one input and the control signal immediately ceases.

The delay means of the present invention preferably comprises two diodes in a line which carries the control signal from the logic means, and a capacitor connected to the said line at a point between the diodes, the capacitor being arranged to receive a change as the control signal modifies the transmission torque demand signal and, on cessation of said control signal the capacitor is arranged to discharge so that current therefrom passes through one of the said diodes to continue modifying the transmission torque demand signal at a diminishing rate, the charge being prevented by the other diode from passing along said line towards the logic means. Such an arrangement of diodes is less complex than a system of monostable multivibrators as described in the aforesaid British patent and yet is most effective in providing a gradual resumption of pressure controlled only by the transmission torque demand signal.

The control signal may be arranged to modify the transmission torque demand signal in such a manner that the regulator means will reduce the fluid pressure to around 10% of its maximum pressure. If the fluid pressure is less than 70% of its maximum at the time when the control signal is applied, the control signal preferably has substantially no effect on the transmission torque demand signal.

A control system in accordance with the invention will now be described by way of example with reference to the accompanying drawings in which.

The invention will be described as applied to a transmission having gears 6 (FIG. 3) which produce a series of increasing speed ratios and two clutches 7, 8 alternatively engagable to provide drive through sequential speed ratios in the series. The invention is, however, applicable to all transmissions having fluid pressure engaged clutches.

Figure 1:
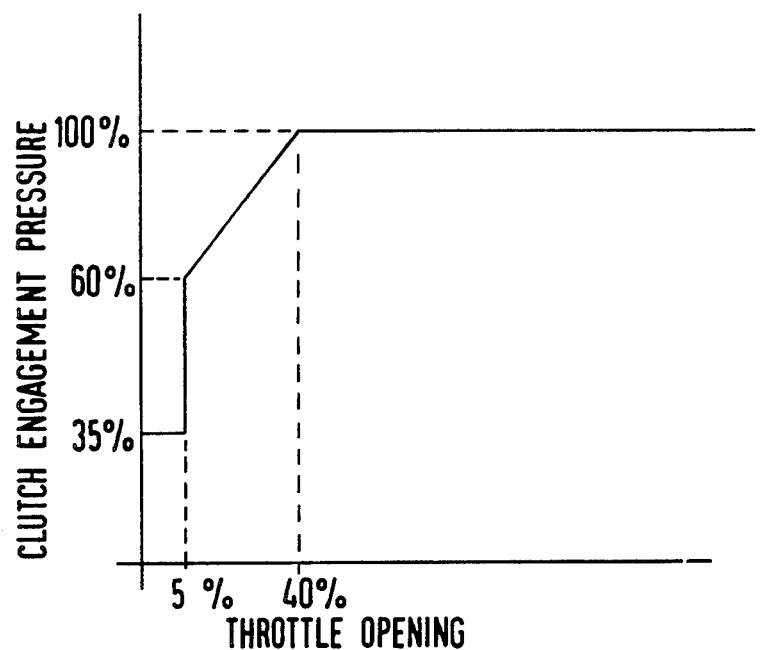
FIG. 1 is a graph of clutch engagement pressure plotted against throttle opening for an automatic transmission having continuous throttle modulation of clutch engagement pressure.

With reference to FIG. 1 there is shown a graph of transmission clutch engagement pressure against throttle opening, both expressed as percentages, for a transmission having continuous throttle modulation of clutch engagement pressure by modulating the pressure of operating fluid for the clutch.

It can be seen that 35% of maximum pressure is provided at tick over speeds (less than 5% throttle opening) and that pressure increases linearly from 5% to 40%. Maximum pressure is maintained at throttle openings above 40%. It has been found that this characteristic gives acceptable transmission performance over a wide range of transmission operating conditions but that under certain circumstances a severe clutch engagement is effected, for example during a full throttle radio downchange as related in the introduction to this specification.

Figure 2:
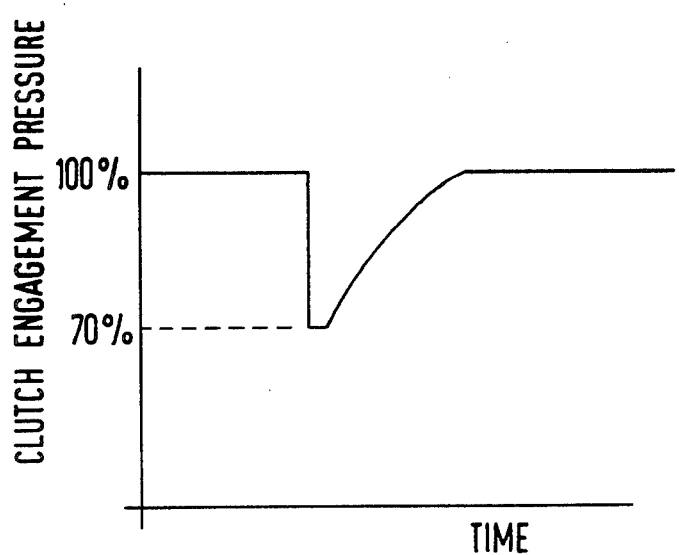
FIG. 2 is a graph of clutch engagement pressure against time illustrating the effect of the invention.

During such a downchange, where excess clutch torque at maximum engagement pressure is provided, the invention provides for engagement pressure to be dropped to about 70% of maximum pressure so that the clutch has capacity to transmit maximum engine torque only. Engagement pressure after initial clutch engagement is allowed to rise back up to maximum pressure. This characteristic is illustrated in FIG. 2, the time period for the pressure to rise to maximum being, in this example, of the order of half a second.

In practice, throttle modulation of transmission main pressure is frequently used to control clutch engagement pressure and all transmission components are adapted to operate at the continuously varying pressure. In such circumstances it is important that an imminent ratio change be accurately sensed and that main pressure is not dropped until the ratio change is in progress so as to avoid adversely affecting other transmission components. Alternatively throttle modulation may be applied to a particular operating pressure, for example that associated with a particular clutch.

Figure 3:
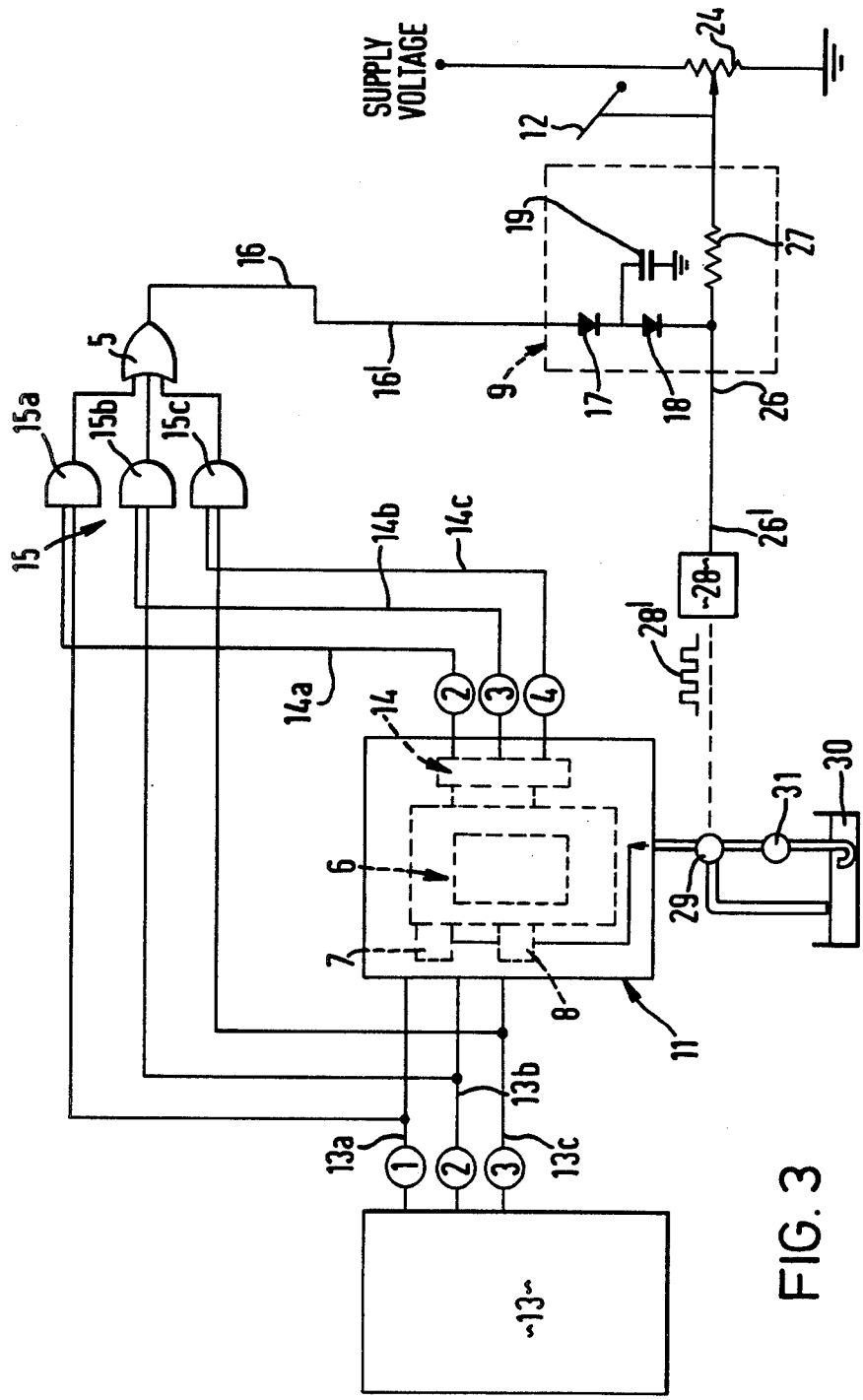
FIG. 3 is a schematic diagram of an electro-hydraulic circuit embodying the invention and producing the effect illustrated in FIG. 2.

With reference to FIG. 3 there is shown an electro-hydraulic circuit which will fulfill this requirement.

A transmission 11 has an electronic control command unit 13 responsive to transmission operating parameters (e.g. engine torque and transmission output shaft R.P.M.) and which commands selection of speed ratios 1 to 4 in the transmission 11 by command signals 13a, 13b and 13c. Sensors 14 provide sensor signals 14a, 14b and 14c to indicate that a particular speed ratio has been selected. (Only those signals relevant to the instant invention have been shown, many more would be provided for a complete control system).

For a downchange, say, from ratios 4 to 3, command signal 13c is applied. As the change takes place, the signal 14c corresponding to ratio 4 ceases and once the change to ratio 3 is complete signal 14b is generated and signal 13c ceases. Downchanges from ratios 3 to 2 and 2 to 1 are performed in a similar manner.

The command signals 13a, 13b and 13c are received as inputs by respective logic AND elements 15a, 15b and 15c and the sensor signals 14a, 14b and 14c are also received as inputs by the respective AND elements. The AND elements have outputs connected via a logic OR element 5 to a control line 16 which includes a delay device indicated generally at 9. The delay device includes two diodes 17, 18 arranged in series and which prevent electric current flowing along line 16 towards the AND elements. A capacitor 19 has a terminal connected to line 16 between the diodes 17, 18.

A potentiometer 24 adjustable by an engine throttle control 12 delivers a torque demand signal 26' along a line 26 via a resistor 27 to a control unit 28. The line 16 is connected to the line 26 between the resistor 27 and control unit 28. The control unit 28 produces a square wave signal 28' whose mark to space ratio may be varied in accordance with the torque demand signal 26'.

The unit 28 controls a solenoid operated dump valve 29 which regulates pressure of fluid delivered to the tranmission from a reservoir 30 by a pump 31. The mark to space ratio of the high frequency signal 28' from control unit 28 has the effect of maintaining the dump valve in a particular operating condition with a fast and accurate response to signal changes. The dump valve 29 can therefore accurately regulate transmission pressure in accordance signals 28' received from the control unit 28 and thereby control clutch engagement pressure.

Figure 4:
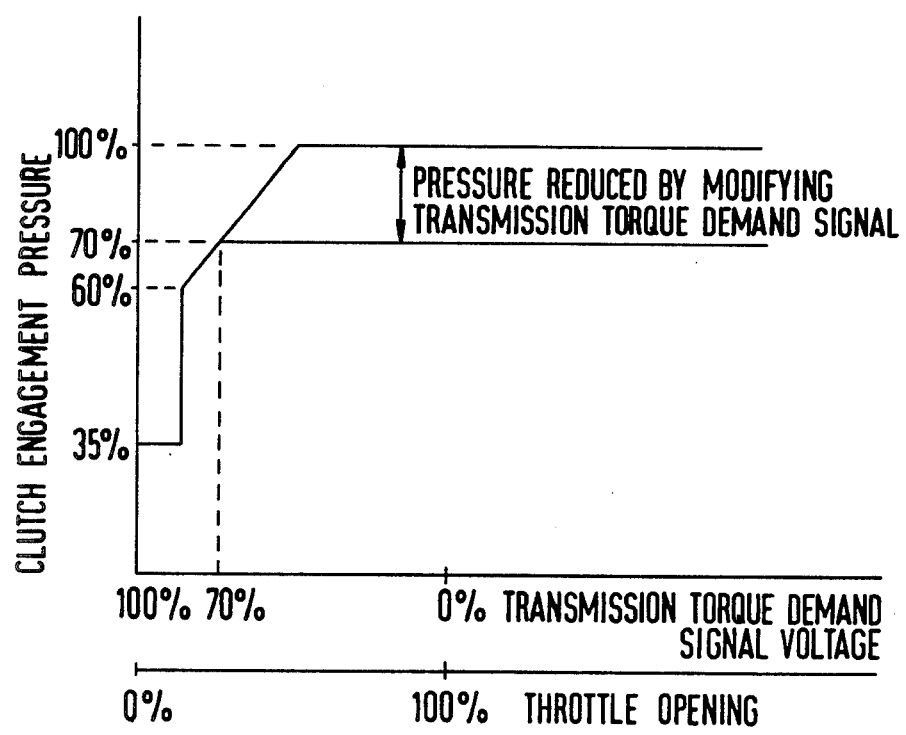
FIG. 4 is a graph similar to FIG. 1 and illustrating the effect of the invention on clutch engagement pressure.

In use and, say, when the 4th speed ratio is selected, the control unit 28 will be operating in a manner dictated by the torque demand signal 28' which is controlled by the potentiometer 24. The diode 18 prevents current flowing from line 26 along line 16. Sensor signal 14c is received by AND element 15c but there is no output therefrom as no command signal 13c is being received. As soon as command signal 13c is received by the AND element 15c, the inputs 13c and 14c allow the AND element to produce a signal which passes to OR element 5. The output from the OR element constitutes a control signal 16' in line 16. The command signal 13c commands the transmission to select the 3rd speed ratio and as it does so the signal 16' causes pressure downstream of valve 29 to be modified as follows:

The signal 16' flows through the diodes 17, 18 to the line 26 thus modifying the torque demand signal 26'. Preferably the control signal 16' modifies the transmission torque demand signal 26' so as to cause the control unit 28 to reduce the fluid pressure to approximately 70% of maximum main pressure. Where the throttle opening is already such that the fluid pressure is below that level, the application of signal 16' to line 26 has substantially no effect on the control unit 28. A suitable characteristic of control voltage and pressure is shown in FIG. 4. In that figure throttle opening above approximately 40% will result in 100% pressure downstream of valve 29 and, therefore, 100% clutch engagement pressure. Where a ratio down change is commanded, the signal 16' introduces a potential in line 26 sufficient to reduce the fluid pressure and hence the clutch engagement pressure to 70% of its maximum. In FIG. 4 the signal 16' brings the total voltage in line 26 to 70% of its maximum working voltage of, say, 10 volts.

As soon as 3rd speed ratio is selected, the command signal 13c ceases, the sensor signal 14c disappears, a sensor signal 14b is received by AND element 15b, and the AND element 15c ceases to provide an output. On so doing, the signal 16' in line 16 disappears. However, the capacitor 19, which will have been charged by signal 16' originally flowing through line 16, now discharges so that the effect of signal 16' fades gradually. Thus the capacitor delays voltage reversion in line 26 and modifies main pressure in accordance with the characteristic of FIG. 2. Downchanges from 3rd to 2nd and 2nd to 1st speed ratios also result in modification of torque demand signal in a similar manner through the operation of AND elements 15b and 15c respectively. An alternative delay device (not shown) may be provided to produce a delay in the initiation of modification of the transmission torque demand signal.

Other electrical components may be introduced to modify the pressure rise and pressure drop characteristics of FIG. 2 dependent on the particular ratio change it is desired to modify. Furthermore, an alternative electrical circuit maybe provided to give a different pressure rise delay characteristic dependent on the particular ratio change.

Although the invention has been described with reference to modification of engagement pressure for an on-coming clutch it is equally applicable to control of an off-going clutch. The invention is also applicable to control of other hydraulically actuable components of a transmission. Also, the invention is applicable to any other automatic transmission apparatus whose performance is dependent on the value of a transmission fluid pressure.

What I claim as my invention and desire to secure by Letters Patent in the United States is:

1. A control system for a rotary power transmission having means for providing a series of speed ratios, a pump for delivering fluid under pressure, speed ratio selectors selectively engageable by means of the fluid pressure to enable drive to be transmitted through the transmission, and regulator means for regulating the fluid pressure in response to an engine demand signal, said control system including sensor means arranged to provide a sensor signal which indicates a state of engagement or disengagement of a speed ratio, command means arranged to provide a command signal which causes the selector means to select a different speed ratio, said command means being operable in response to transmission operating parameters, logic means arranged to receive said sensor signal and command signal and which in response thereto provides a control signal for modifying the torque demand signal, and delay means responsive to said control signal to delay the effect of initiation and/or cessation of said signal on said torque demand signal.

2. A control system according to claim 1 in which the speed ratio selector means comprise clutches for selecting the respective speed ratios and the command signals actuate said clutches to select the desired ratios whereby on receiving a command signal, a clutch will effect a change from one speed into another speed ratio and the sensor signal for indicating that the other speed ratio has been selected will thereupon be produced to provide an input to said logic means, and on receiving the command signal to re-select the said one speed ratio, the command signal will be received as a furtherinput to the logic means which will then produce the control signal for modifying the torque demand signal.

3. A control system according to claim 2 in which the logic means includes an AND element which provides an output for producing the control signal after receiving the command signal and sensor signal as inputs.

4. A control system according to claim 3 in which a plurality of AND elements is provided for receiving the respective command signals.

5. A control system according to claim 4 in which the output of each AND element passes to a logic OR element which provides the control signal as an output.

6. A control system according to claim 1 in which the delay means comprises two diodes in a line which carries the control signal from the logic means and a capacitor connected to the said line at a point between the diodes, the capacitor being arranged to receive a charge as the control signal modifies the torque demand signal and, on cessation of said control signal, the capacitor is arranged to discharge so that current therefrom passes through one of the said diodes to continue modifying torque demand signal at a diminishing rate, the charge being prevented by the other diode from passing along said line towards the logic means.

7. A control system according to claim 1 in which the regulating means produces a square wave electrical signal in response to said torque demand signal and variation of said torque demans signal varies the mark to space ratio of said square wave signal, the latter being arranged to control a valve for regulating the fluid pressure.

8. A control system according to claim 1 in which the control signal modifies the torque demand signal so as to cause the regulator means to reduce the fluid pressure to substantially 70% of its maximum pressure.

9. A control system according to claim 8 in which the control signal has substantially no effect on the torque demand signal where the fluid pressure is less than substantially 70% of its maximum pressure when the control signal is generated.

10. A control system and rotary transmission combination comprising
   gears for providing a series of speed ratios,
   a pump for delivering fluid under pressure,
   clutches for selectively engaging said speed ratios by means of the fluid pressure,
   a throttle controlled potentiometer for providing an engine torque demand signal, regulator means for regulating the fluid pressure, said regulator means including a unit which produces a square wave electrical signal in response to said torque demand signal and which controls a pressure regulating valve for the fluid, sensor means arranged to provide a sensor signal each time one of the speed ratios is selected, command means arranged to provide a command signal which effects a change from one speed ratio to another, said command means being operable in response to transmission operating parameters, a plurality of logic AND elements arranged to receive the sensor signals and command signals in such a manner that ratio will be received by one AND element as an input and when a command signal is generated to command a change from that speed ratio to another, the command signal will also be received by said one AND element as an input whereupon said one AND element will provide an output for producing a control signal for modifying the torque demand signal so that the fluid pressure falls during ratio change to reduce the engagement pressure of the clutch effecting the change, said sensor signal input being arranged to cease once the ratio change has taken place whereby the AND element will cease to function and the control signal therefrom will cease, a logic OR element for receiving the outputs from the AND elements and which provides an output constituting said control signal, and delay means comprising a pair of diodes in a line which carries the control signal and a capacitor which is connected to the line between the diodes, said capacitor being arranged to receive a charge from the control signal as the latter passes through said line and to discharge after the control signal has ceased so that on cessation of the control signal the discharging capacitor will continue to modify the torque demand signal at a diminishing rate until the fluid pressure is controlled only by said torque demand signal.

* * * * *

UNITED STATES PATENT AND TRADEMARK OFFICE
CERTIFICATE OF CORRECTION

PATENT NO. : 4,481,843
DATED : November 13, 1984
INVENTOR(S) : ROGER P. JARVIS and HARRY M. WINDSOR It is certified that error appears in the above-identified patent and that said Letters Patent is hereby corrected as shown below:

Column 2, line 65, delete "change" and
  insert --charge--

Column 5, line 35, delete "15c" and insert
  --15a--

Claim 1, line 7, after the word "engine"
  insert --torque--.

Signed and Sealed this

Seventeenth Day of September 1985

[SEAL]

Attest:

DONALD J. QUIGG

Attesting Officer

Commissioner of Patents and
Trademarks—Designate